UNITED STATES PATENT OFFICE.

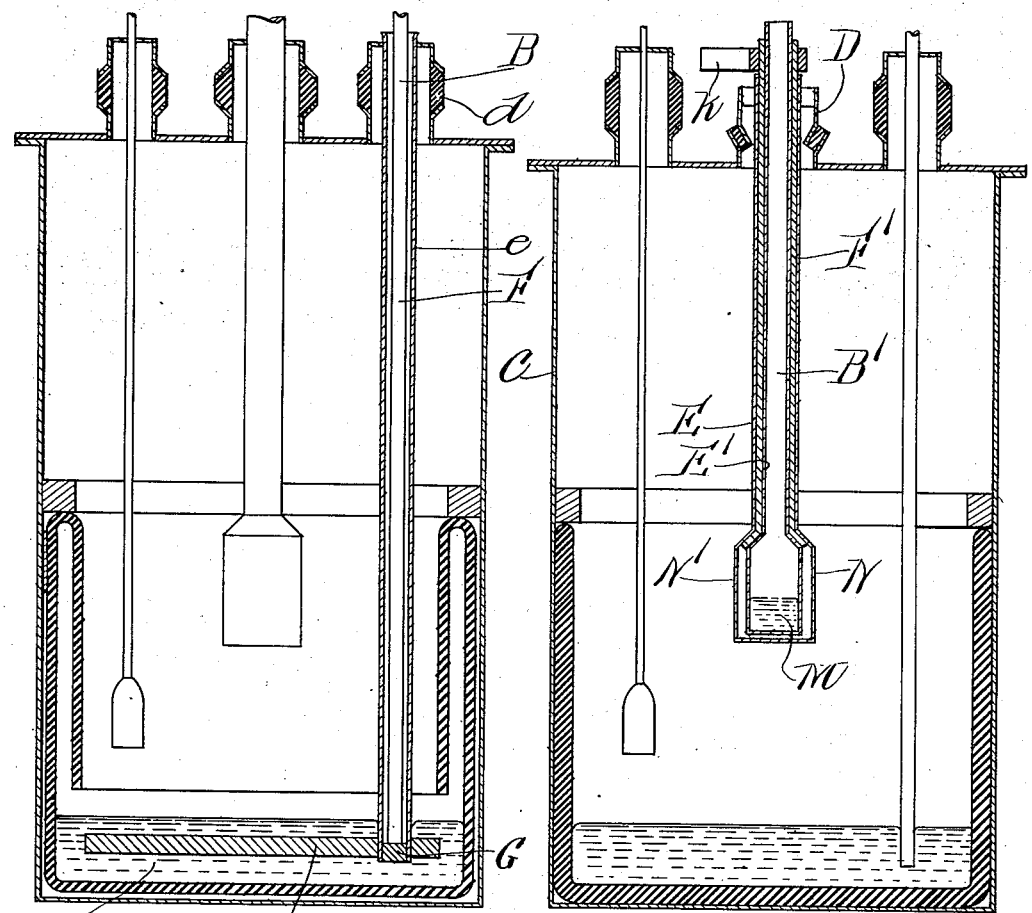
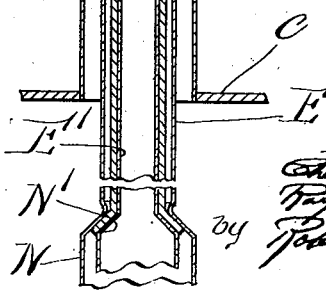

CHARLES A. KRAUS, OF NEWTON HIGHLANDS, AND ROY D. MAILEY, OF LYNN, MASSACHUSETTS.

ELECTRODE-LEAD.

1,076,292.   Specification of Letters Patent.   Patented Oct. 21, 1913.

Application filed June 30, 1910. Serial No. 569,695.

*To all whom it may concern:*

Be it known that we, CHARLES A. KRAUS and ROY D. MAILEY, both citizens of the United States, and residents, respectively, of Newton Highlands and Lynn, in the counties of Middlesex and Essex and State of Massachusetts, have invented new and useful Improvements in Electrode-Leads, of which the following is a specification.

Our invention relates to the construction of leads for the electrodes of vapor electric apparatus such as mercury arc rectifiers.

Heretofore the commercial construction of mercury arc rectifiers has been restricted to apparatus of comparatively small capacity and in a measure the limitations in capacity of such apparatus have been due to the difficulties in the way of employing electrodes and electrode leads of sufficiently large dimensions to carry large currents. So far as the employment of electrode leads of liberal size is concerned, this has been practically effected by means of sundry improvements relating to hermetically sealed joints and the connection of electrodes thereby to metallic containers for such purpose, these improvements being shown and described in application for Letters Patent of the United States Serial No. 514,859 and No. 514,908 filed on or about August 27th, 1909.

In designing a mercury arc rectifier for example for a capacity of 1000 amperes, it is desirable to obtain a maximum current carrying capacity of the leads with a minimum of size and weight in the leads and electrodes since whatever the nature of the joint or seal by which the electrode leads are secured to the container wall, there is a practical limit to the size and weight of the electrode and lead which such joint can safely carry.

We have found that it is not desirable to increase the current density in an electrode lead above 4000 amperes per square inch of lead sections if the lead itself be made of copper. The presence and constant circulation of mercury within a rectifier jacket makes it obviously undesirable to employ copper for an electrode lead under such conditions as bring it into contact with mercury, since copper amalgamates therewith and is to a measurable extent soluble therein. On the other hand, if iron alone which is not susceptible to destructive action by mercury, be employed for an electrode lead, the dimensions and weight of the lead, assuming a given desired capacity, must be increased over what would be necessary in the case of copper. Should iron be employed as an electrode lead in a rectifier of large capacity, these leads would be unduly heavy and endanger the integrity and permanency of the joints. To meet this situation we have made improvements in the construction of electrode leads which are herein described. We employ for the current carrying electrode lead a metal of high conductivity, such as copper, and protect it against the injurious action of mercury by surrounding it with a sheath of metal which is resistant to the action of mercury, such as iron or nickel. At the electrode end of this lead the metal sheath is closed by a plug or terminus of similar mercury resisting material, the core of more highly conducting material being either welded or soldered to the sheath or to its electrode terminus. The highly conductive core may be made either solid or tubular, according to circumstances.

In the accompanying drawings which illustrate examples of our invention,—Figure 1 shows in vertical cross section portions of a metal contained rectifier within which is a cathode which embodies our improvements; Fig. 2 is a sectional view of an anode also embodying these improvements, though in form different from the electrode shown in Fig. 1; and Fig. 3 shows in cross section an electrode lead the same in general character as that shown in Fig. 2 but exhibiting variations therefrom.

Referring to Fig. 1, A represents the mercury cathode and B the cathode lead which is sealed in and insulated from the metal walls of the container by the joint at D. This lead consists of a rod or core F of highly conductive material such as copper surrounded by a tubular sheath of iron or steel. At the bottom of this tubular sheath the copper core F is secured preferably by welding to an iron plug G which is also secured preferably by welding into the end of the tube or sheath E. The form of cathode which is preferred for apparatus of this character includes also a foot plate, such as an iron plate H which is welded to the outside of the steel tube E and affords a large contacting surface to carry current from the mercury cathode A. This variety of cathode construction is more fully described and its adavantages pointed out in an application for United States Letters Patent Serial No. 569,701, filed concurrently herewith and is the subject of claim therein.

Referring to Fig. 2, M represents a hollow electrode provided with a hollow electrode lead B'. This lead consists of a tube F' of high-conductive material, such as copper, which is externally protected against the action of mercury by the sheath or sleeve E which extends through and is jointed to the mercury container C by means of the joint D which is preferably the same in substance as that shown in connection with Fig. 1. The sheath E is joined to and substantially equal with the enlarged electrode terminus M, this being composed of iron or steel or some protective substance which resists the action of mercury, and the tubular copper lead F' is secured preferably by welding to this electrode terminus.

The construction shown in Fig. 2 is designed to provide means for regulating the temperature of the electrode which include a mercury pool as at N contained in the interior of the hollow electrode. This electrode construction and its provisions for temperature regulation form the subject matter of claim in an application Serial No. 569,698, filed concurrently herewith. When such an interior body of mercury is employed it becomes necessary to protect the copper conductor F' on the inside as well as the outside and we therefore provide an inner sheath E' of iron or steel or some metal resistant to the action of mercury, continuing this sheath to form the inner receptacle N' which contains the mercury pool. The current may be led from the highly conductive tubular core F' by means of connections such as the clip or tongue K.

When a lead to which a current is conducted operates at high temperature a considerable amount of heat is necessarily carried along the lead and the joint by means of which the lead is attached to the container may thus be subjected to wide variations in temperature. It is desirable therefore to decrease as far as is practicable the amount of heat which may be transmitted to the joint from the lead, and an arrangement for accomplishing this object is shown in Fig. 3, in which figure the tubular highly conductive core F', the outer sheath E and inner sheath E' are arranged in the same manner as shown in Fig. 2 with the exception that the outer sheath E is spaced from the conductive tube. It will be desirable to exhaust this space between the conductive tube F and the outer sheath E, and for this purpose a tubular extension T is provided through which the space within the sheath E may be exhausted and the extension T then sealed. The provision of a space or jacket around the conductive tube F' will effectually reduce the amount of heat transmitted by radiation from the electrode lead to the joint at D.

The welded metal connections hereinabove mentioned may readily be made by means of the oxy-acetylene flame.

What we claim and desire to secure by Letters Patent is:

1. In a vapor electric apparatus comprising a closed container adapted to include mercury vapor, an electrode, an electrode lead therefor consisting of a tube of highly conductive material sheathed within and without with metal resistant to the action of mercury, and a pool of mercury in the sheathed interior of said tube.

2. In a vapor electric apparatus comprising a closed container adapted to include mercury vapor, an electrode, an electrode lead therefor sealed into the container wall and composed of a core of highly conductive material, and a sheath of metal resistant to the action of mercury, the said sheath being spaced from said core where it lies adjacent to the sealing joint of the lead.

3. In a vapor electric apparatus comprising a closed container adapted to include mercury vapor, an electrode, an electrode lead therefor sealed into the container wall and composed of a core of highly conductive material, and a sheath of metal resistant to the action of mercury, the said sheath being spaced from said core where it lies adjacent to the sealing joint of the lead, the space between the core and sheath being exhausted.

4. In a vapor electric apparatus comprising a closed container adapted to contain mercury vapor, an electrode, an electrode lead therefor consisting of a tube of highly conductive material internally sheathed with metal resistant to mercury, and an external sheath of similar resistant metal, said external sheath being spaced from the highly conductive tube where it lies adjacent to the seal of the electrode lead, and a pool of mercury in the sheathed interior of said tube.

5. In a vapor electric apparatus comprising a closed container adapted to contain mercury vapor, an electrode, an electrode lead therefor consisting of a tube of highly conductive material internally sheathed with metal resistant to mercury, and an external sheath being spaced from the highly conductive tube where it lies adjacent to the seal of the electrode lead, and a pool of mercury in the sheathed interior of said tube, the said space between the tube and outer sheath being exhausted.

Signed by us at Boston, Massachusetts, this twentieth day of June 1910.

CHARLES A. KRAUS.
ROY D. MAILEY.

Witnesses:
CHARLES D. WOODBERRY,
JOSEPHINE H. RYAN.